United States Patent [19]

Feisel et al.

[11] Patent Number: 4,518,076
[45] Date of Patent: May 21, 1985

[54] WORKPIECE PALLET TRAY WITH PLASTIC INSERT HOLDERS

[75] Inventors: Armin Feisel, Schaffhausen; Walter Wirz, Pfaffikon, both of Switzerland

[73] Assignee: Reishauer AG, Switzerland

[21] Appl. No.: 290,022

[22] Filed: Aug. 5, 1981

[30] Foreign Application Priority Data

Aug. 15, 1980 [CH] Switzerland ............... 6178/80

[51] Int. Cl.³ ................................ B65G 25/00
[52] U.S. Cl. .................... 198/648; 198/472; 29/823; 73/864.91; 220/410; 422/65
[58] Field of Search .......... 198/472, 648, 646, 656, 198/850; 269/40, 56, 303; 211/60 R, 60 T, 13; 108/24, 28; 220/408, 410; 206/329, 343, 347, 486; 104/134, 242, 119; 73/864.91; 422/63, 65; 29/25.25, 823

[56] References Cited

U.S. PATENT DOCUMENTS

| | | | |
|---|---|---|---|
| 2,614,399 | 10/1952 | Roethez | 220/410 X |
| 3,015,287 | 1/1962 | Noel | 198/648 |
| 3,150,765 | 9/1964 | Ellis | 198/648 |
| 3,538,997 | 11/1970 | Christine et al. | 198/656 |
| 3,897,216 | 7/1975 | Jones | 422/65 X |
| 4,039,148 | 8/1977 | Tamura et al. | 198/648 |
| 4,040,533 | 8/1977 | DeBoer et al. | 198/472 |

FOREIGN PATENT DOCUMENTS 570237 12/1975 Switzerland .
438927 8/1974 U.S.S.R. ............... 73/864.91

Primary Examiner—Joseph E. Valenza
Assistant Examiner—Jonathan D. Holmes
Attorney, Agent, or Firm—Sughrue, Mion, Zinn, Macpeak, and Seas

[57] ABSTRACT

A pallet tray for transporting and storing workpieces in an automatic feed system attached to a machine tool includes an elongated metallic base member 1 having a plurality of plastic inserts 2 mounted thereon. Each insert has one or more holding pockets 3 for the individual workpieces. The base member has an inverted U-shaped profile defining a recessed guide groove 7 in the longitudinal direction which cooperates with a guide rail of the workpiece feeding system. With such construction different inserts can be provided to accommodate variously configured workpieces to thereby avoid the separate injection molding of a number of differently dimensioned, complete pallet trays.

8 Claims, 7 Drawing Figures

WORKPIECE PALLET TRAY WITH PLASTIC INSERT HOLDERS

BACKGROUND OF THE INVENTION

This invention relates to a pallet tray for transporting and storing workpieces in an automatic feed system attached to a machine tool, and particularly to such a tray having a common base member provided with recesses for the mounting of plastic inserts having holding pockets to accommodate individually configured workpieces.

A system for the feeding, withdrawal and reinsertion of such workpiece carrying pallet trays is described in Swiss Pat. No. 570,237. The workpieces occupy positions oriented in accordance with the production requirements, and are thus supplied to the loading and unloading stations of the machine tool. Each workpiece is taken in sequence from the pallet tray and, after its machining has been effected, it is placed back on the tray in its original position and orientation. The pallet trays are arranged parallel to each other at regular intervals on a conveyor system, and are advanced in steps under the control of a timing pulse generator. The system has automatically activated means for lifting each individual pallet tray from the conveying system or for sliding the tray off of a guide rail. Further means are provided for supplying the pallet tray to the loading and unloading stations of the machine tool, for passing it through the tool positions in a timed manner, and for returning the tray, carrying the machined workpieces, to the conveying system or to a guide rail thereof.

The pallet tray disclosed in Swiss Pat. No. 570,237 comprises a solid, unitary body made of a wear resistant plastic material. The high wear resistance is especially required owing to the heavy demand on the holding pockets for the workpieces since they are subjected to many cycles during which the workpieces are inserted and removed. With such plastic pallet trays attention must be given to maintaining all of the wall thicknesses as identical as possible and to avoiding material accumulations in order to prevent or minimize the warping of the trays during their production and subsequent use. This requires that separate pallet trays must be produced for each different sized holding pocket that is required, however, owing to the many differently configured workpieces that must be accommodated. It is thus not sufficient to just replace the inserts required for the different holding pockets at the injection mold, but instead a separate and costly mold must be provided for the manufacture of each differently dimensioned pallet tray.

SUMMARY OF THE INVENTION

In accordance with the present invention the expense and disadvantages attendant with the prior art system described above are avoided by providing a pallet tray comprising an elongated, metallic base member in which a plurality of plastic inserts are mounted. The inserts are provided with holding pockets configured to accommodate differently dimensioned workpieces, and the base member defines a longitudinal guide groove to implement its transport and handling.

DETAILED DESCRIPTION OF THE PREFERRED EMBODIMENTS

Figure 1:
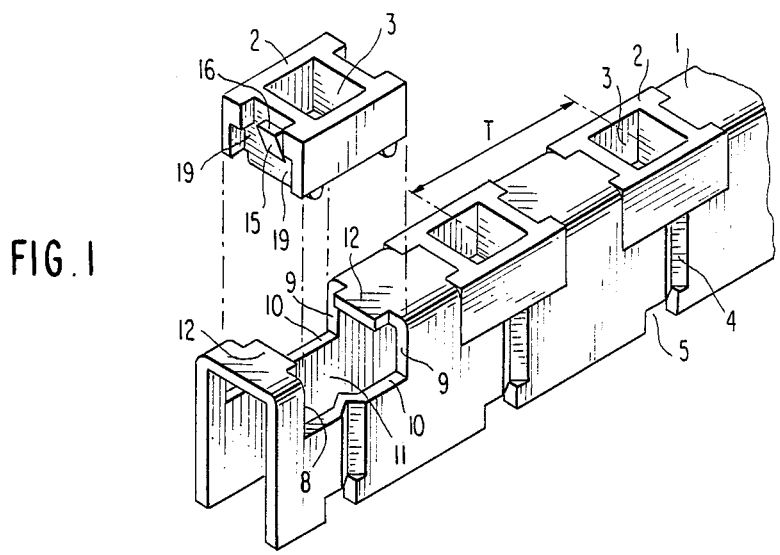
FIG. 1 shows a perspective view of a pallet tray according to the present invention.
Figure 2:
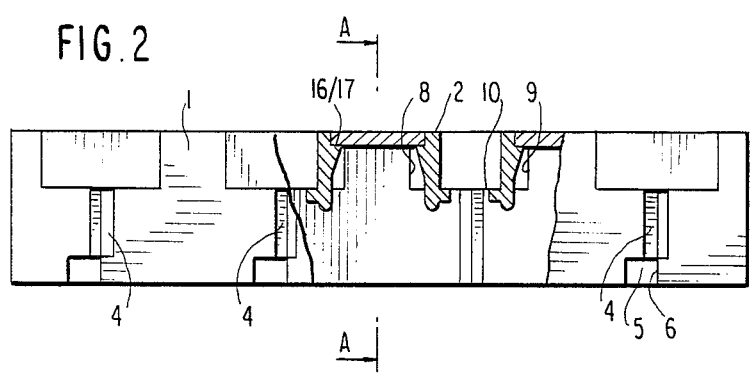
FIG. 2 shows a vertical projection of the base member of the pallet tray.
Figure 3:
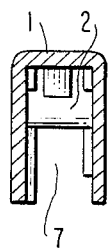
FIG. 3 shows a cross-section taken along line A—A in FIG. 2.
Figure 4:
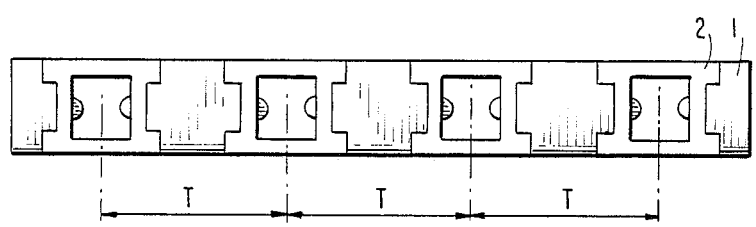
FIG. 4 shows a horizontal projection of the base member.
Figure 5:
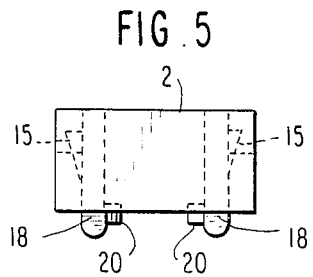
FIG. 5 shows a vertical projection of the plastic insert.
Figure 6:
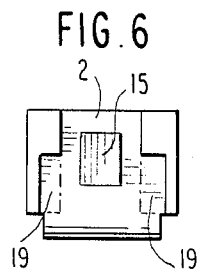
FIG. 6 shows a lateral projection of the plastic insert.

Referring to the drawings, the pallet tray is designed to accommodate a plurality of similarly oriented workpieces in a longitudinal row, and includes a base member 1 and a plurality of plastic inserts 2 separately mounted therein, each insert having a holding pocket 3 configured to accommodate a particularly dimensioned workpiece. The holding pockets 3, which are substantially cubic in the example shown, each have the same orientation and dimension whereby the workpieces individually removed and delivered to the machine tool are thereafter returned to the same pallet tray pocket in the same orientation during the reloading of the tray.

The distance T between the holding pocket centers in the longitudinal direction of the pallet tray are determined according to the shape and dimensions of the workpieces being accommodated and the requirements of the machine tool handling system. Grooves 4 are provided on at least one side of the base member to accommodate gripping devices of the machine tool when passing through the loading and return stations of the workpieces or when inserting and removing the pallet trays, such grooves appearing as V-shaped recesses in the example shown. The base member may also be provided with additional notches 5 on one or both lower longitudinal sides for similar gripping purposes, the notches shown having rectangular configurations and each being provided with an abutment face 6. The spacing between adjacent notches 5, as with the grooves 4, may correspond to the distance T between the holding pockets 3 or may coincide with the center lines of the pockets.

To prevent warping and distortion during manufacture and use, the body member 1 is fabricated of a rigid material, for example sheet metal or injection molded metal, and has an inverted U-shaped profile defining a longitudinal groove 7 on its under side to facilitate its guidance and handling.

The inserts 2 are made of a wear resistant plastic material whereby the holding pockets 3, which are subject to high abrasion during the frequent insertion and removal of workpieces, have a long service life and a high degree of dimensional stability. The costs for producing injection molds to manufacture differently configured plastic inserts are considerably lower than for providing a plurality of differently dimensioned molds for the overall pallet trays owing to the relatively smaller dimensions of the inserts per se.

The body member 1 is provided with a plurality of recesses 11 defined by edge surfaces 8, 9 and 10 having dimensions corresponding to those of the plastic inserts 2. Each of the surfaces 8, 9 has a prismatic projection 12 on the top edge of the base member which acts as a snap closure for an insert 2 to facilitate the firm mounting and retention thereof.

Figure 7:
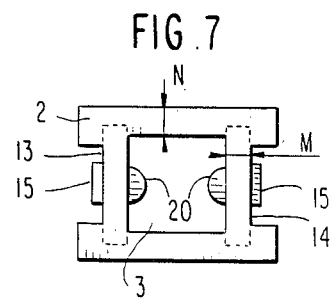
FIG. 7 shows a plan view of the insert.

To minimize any potential warping of the plastic inserts 2 during their production, their lateral and side wall thicknesses M and N are equally dimensioned throughout, as best seen in FIG. 7.

The inserts 2 have profile dimensions closely corresponding to those of the recesses 11 in the base member 1, and are provided with wedge projections 15 on each of their lateral surfaces 13 and 14 which are cammed inwardly by the prismatic projections 12 when the inserts are forcibly pushed into their recesses 11 during mounting. The wedge projections spring back after each plastic insert has been completely installed to engage behind the prismatic projections along surfaces 16, 17, whereby each insert is firmly held in the base member. The inserts are normally not intended to be removed from the base member after their installation, but if such removal should become necessary this can easily be accomplished by pinching the surfaces 13 and 14 towards each other from below using an appropriately shaped tool.

Two cross rails 18 are formed on the lower side of each plastic insert 2, and their lengths are equal to the width of the guide groove 7 of the base member. The end surfaces of these rails 18 thus bear against the inner side walls of the base member after installation to provide lateral stability for the plastic inserts. The cross rails 18, which project downwardly into the guide groove 7 of the base member, also serve to support the pallet trays on the conveyor system guide rails during their transport and handling. In this way it is possible to achieve a low friction and low wear pairing of metal and plastic for most of the surfaces subject to contact and abrasion during the movement of the pallet trays.

To prevent undesired local accumulations of extraneous material on the plastic inserts 2, portions 19 thereof shown in chain line may be removed or eliminated.

The holding pockets 3 are configured as through holes which terminate in the guide groove 7 of the base member 1 in order that, particularly when cleaning the pallet trays, loose dirt and debris can simply be flushed off and drained away. To prevent the inserted workpieces from falling through and to fix them in axially predetermined positions, a pair of lugs 20 are provided on the lateral walls of each insert which project into the holding pocket 3.

To accommodate workpieces of particularly small dimension or diameter, each insert 2 may be provided with two or more appropriately configured holding pockets 3, although this alternative is not shown in the drawings.

What is claimed is:

1. A pallet tray for transporting and storing workpieces, particularly in an automatic feeding system attached to a machine tool, comprising; an elongated, metallic, base member (1) having a guide groove (7) running in its longitudinal direction, a plurality of plastic inserts (2) each having a holding pocket (3) configured to accommodate a particular workpiece and mounted at spaced positions in said base member, said plastic inserts being snapped into recesses (11) of the base member (1), and being provided with projections (15) which engage behind cooperating projections (12) on the base member to form a snap lock, said plastic inserts having at least one cross rail (18) at the bottom thereof which engages the guide groove of the base member for laterally stabilizing the inserts and for resting on a guide rail for the pallet tray so as to form a low friction means of engagement between said pallet tray and said guide rail.

2. A pallet tray according to claim 1, wherein gripping means (4, 5, 6) are provided on the pallet tray to implement its manipulation.

3. A pallet tray according to claim 2, wherein the gripping means comprises at least one of transverse slots (4), recesses (5) and stops (6) in the metallic base member.

4. A pallet tray according to claim 1, wherein the base member is made of sheet metal.

5. A pallet tray according to claim 1, wherein the plastic inserts are provided with wall openings (19) to avoid material accumulations.

6. A pallet tray according to claim 1, wherein the holding pockets are through passages which end in the guide groove, and at least one lug (20) projects into each pocket as a lower support for an inserted workpiece.

7. A pallet tray according to claim 1, wherein the base member is made by injection molding.

8. A pallet tray for transporting and storing workpieces, comprising; an elongated, metallic, base member (1) having upper and lower portions, a groove (7) provided in said lower portion and running in the longitudinal direction of the base member, said top portion including a plurality of openings, a plurality of plastic inserts (2) each having a holding pocket (3) configured to accommodate a particular workpiece, each said plastic insert being supported by and locked by cooperating locking means into each said opening receiving said insert, a bottom portion of each said plastic insert forming a low-friction upper boundary surface of said guide groove for engaging a guide rail.

* * * * *